Feb. 23, 1937.   F. A. HARTGEN   2,072,073
IRON METALLURGY
Filed Sept. 9, 1933
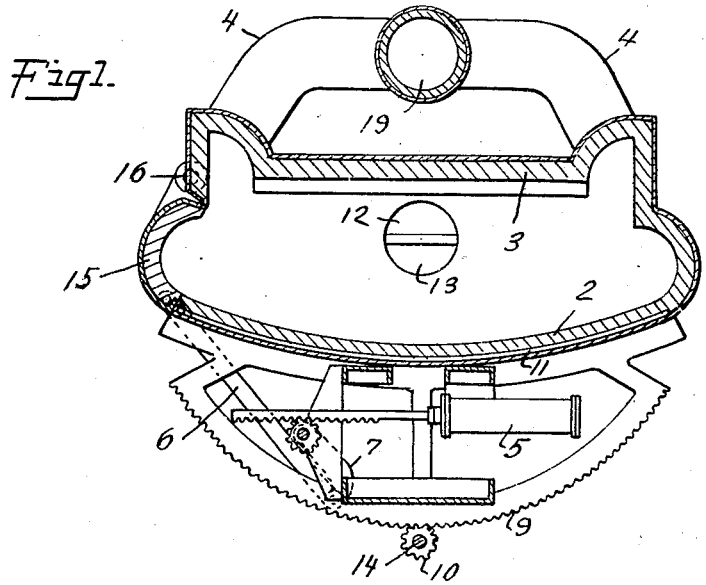
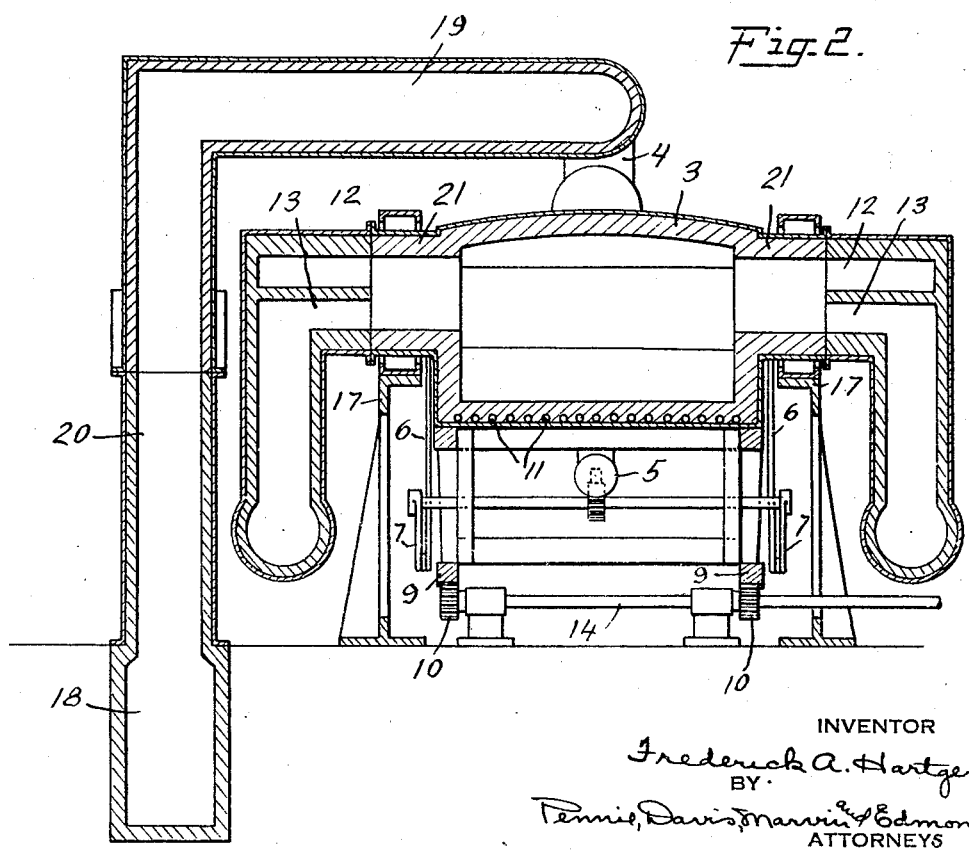
INVENTOR
Frederick A. Hartgen
BY
Pennie, Davis, Marvin & Edmonds
ATTORNEYS Patented Feb. 23, 1937

2,072,073

UNITED STATES PATENT OFFICE 2,072,073

IRON METALLURGY

Frederick A. Hartgen, Reading, Pa., assignor to Reading Iron Company, Reading, Pa., a corporation of Pennsylvania Application September 9, 1933, Serial No. 688,793

18 Claims. (Cl. 75—32)

This invention relates to metallurgy and has for an object the provision of an improved method for treating iron oxide ores to produce metallic iron. The invention further contemplates the production of a novel metallic iron product of high quality.

According to the method of the invention, a molten bath of iron oxide-bearing material, which usually contains one or more solid impurities of an acid character such, for example, as silica ($SiO_2$) and phosphoric acid ($P_2O_5$), is subjected to the action of a reducing agent at a temperature below the melting point of iron to reduce iron oxide contained in the bath. The reducing treatment is discontinued when partial reduction of the iron oxide has been accomplished in order to retain in the reduced charge sufficient iron oxide to form with impurities contained in the charge a slag which is fusible at a temperature below the melting point of iron.

The temperature and reducing conditions employed are preferably such that solid metallic iron is precipitated from the molten bath, forming a fairly coherent mass beneath the surface thereof. When reduction of the desired amount of iron oxide has been accomplished, the reduced mass of metallic iron is removed from the bath and thus separated from the major portion of the molten material of the bath. Some of the molten material of the bath will adhere to the metallic iron product, and a further separation may be effected by squeezing or forging the product or by heating the product to a temperature above the melting point of the metallic iron contained therein. When the metallic iron product is heated to a temperature above the melting point of the iron in a suitable receptacle, the metallic iron and slag form distinct fluid layers which may be separated readily. The resulting molten iron is of high quality, and it may be cast in suitable molds. The product of the squeezing or forging operation is similar to wrought iron products produced heretofore in that it contains slag inclusions and is of substantially the same degree of purity.

Any suitable reducing agent may be employed. When solid carbonaceous reducing agents are employed, they are preferably added directly to the molten baths. The amount of solid reducing agent introduced into the bath will depend upon the nature of the reducing agent and the amounts of impurities contained in the ore and the reducing agent. The amount of reducing agent employed should be incapable of effecting complete reduction of the iron oxide to metallic iron, provision being made for the retention of an amount of iron oxide sufficient to form a fusible slag with the impurities at the desired temperature of reduction. In general, satisfactory results may be achieved by incorporating in the molten charge an amount of reducing agent substantially equal to the theoretical amount required for reduction of the desired amount of iron oxide. The exact amount of reducing agent employed will, of course, depend upon the amount of iron oxide to be reduced, but some degree of control of reduction is provided through the formation of iron silicate ($FeO.SiO_2$) from which the iron oxide is not easily reduced, and amounts of reducing agents somewhat in excess of the theoretical amounts required for accomplishing the desired degree of reduction may be employed without harmful results.

Iron oxide ores generally contain considerable amounts of solid impurities such as silica ($SiO_2$) and phosphoric acid ($P_2O_5$), and if they are treated directly according to the process of the invention, the production of the desirable slag may result in a waste of considerable iron oxide. In order to avoid wasting iron oxide, it is desirable to concentrate relatively impure ores to reduce the content of impurities. Concentration of the ore to reduce the silica content also results in a reduction of the phosphoric acid content.

Any of the usual iron oxide-bearing materials such, for example, as magnetite, limonite and hematite ores and roll scale, may be treated successfully according to the method of the invention.

Any suitable method of concentration may be employed for removing impurities from the iron oxide-bearing material, if removal of impurities is desirable or necessary. Thus, for example, magnetite ore may be subjected to a suitable magnetic concentrating operation, and limonite and hematite may be subjected to suitable gravity concentrating operations.

When solid carbonaceous materials such, for example, as coal are employed as reducing agents, further quantities of impurities such as ash and sulphur are introduced into the charges, and provision must be made for retaining sufficient unreduced oxide to form slag with such impurities in addition to the impurities of the ore.

Slags containing various amounts of iron oxide are suitably fusible within the temperature range employed in the process, and slags of various volumes, therefore, may be obtained. The volume of slag produced will be determined, within certain limits, by its effectiveness in absorbing impurities from the charge. In general, in the treatment of an ore containing not more than about 3% of silica, slag equal in weight to about 15 to 25% of the weight of the reduced bath satisfactorily absorbs the impurities of the charge, including sulphur which may have been introduced into the charge by means of a solid carbonaceous reducing agent.

The volume of the slag produced will depend, also, upon the nature of the complete process, and, more particularly, upon the nature of the metallic iron product sought to be produced. Thus, for example, if a product similar to wrought iron is to be formed, it is advisable to so control the operation as to prevent the formation of a slag bath in which, at the liquidus temperature, the solid phase in equilibrium with the liquid consists of fayalite and metallic iron. When the composition of the bath approaches the composition of fayalite, the rate of reduction is reduced and the process becomes inefficient. The formation of such a slag bath may be prevented by providing, for reduction, molten baths of iron oxide-bearing material containing less than about 20% by weight of silica and discontinuing the reducing treatment when reduction of iron oxide to metallic iron has caused the proportion of silica to be increased to about 20% by weight. If the solid metallic iron product is to be refined by melting to form separable layers of metallic iron and slag, the reducing treatment may be continued as long as the bath remains suitably fluid at the temperature employed for reduction and reduction is suitably efficient.

In carrying out a process in accordance with the invention, the efficiency of the process may be improved by regenerating the bath in which the proportion of silica has been increased to the desired degree through the addition thereto of iron oxide-bearing material containing silica in lesser proportion. Regeneration of the bath may be carried out by adding iron oxide-bearing material either intermittently or continuously as reduction of iron oxide to metallic iron proceeds.

The initial molten bath may be produced in any suitable manner, and the reducing treatment may be conducted without the use of additional heat after formation of the molten bath, or heat may be supplied intermittently or continuously, as desired or required, throughout any stage of the reducing treatment and/or throughout any stage of the regenerating treatments.

When the reducing operation is to be conducted without the use of additional heat, the initial temperature of the molten bath should be sufficiently high that reduction will proceed continuously until the desired amount of iron oxide has been reduced to solid metallic iron, but any initial temperature which will permit a satisfactory degree of reduction to solid metallic iron may be employed. The initial temperature employed will be determined to some extent at least by the nature of the iron oxide-bearing material being treated. Thus, for example, production of a given amount of metallic iron from material consisting largely of ferric oxide ($Fe_2O_3$) or magnetite ($Fe_3O_4$) will require higher initial temperatures than will be required in producing the same amount of metallic iron from material consisting essentially of ferrous oxide (FeO). When heat is supplied intermittently or continuously during the course of the reducing treatment, any temperature below the melting point of iron at which reduction will proceed may be employed.

The regenerating feature of the process of the invention may be employed to produce molten baths for reduction containing any desired proportion of silica.

The initial molten bath provided for reduction should contain sufficient silica or other fluidizing agent to be sufficiently fluid to facilitate the reduction of the iron oxide and separation of the resulting metallic iron. Molten baths containing amounts of silica in excess of about 5 percent by weight and less than the amounts providing the proportions of silica in the slag to be formed are satisfactory. Agents such, for example, as sodium carbonate and fluorspar may be employed in amounts equal to about 1 to 5 percent of the weight of the baths for increasing the fluidity of the materials of the baths.

The use of the regenerating feature of the process of the invention improves the efficiency of the process by permitting utilization of the hot reducing receptacle employed in a preceding reducing treatment for aiding in melting the added iron oxide-bearing material to form a bath suitable for reduction and by permitting the use of iron oxide-bearing materials containing small amounts of silica such, for example, as roll scale and rigidly concentrated iron oxide ore for forming a bath suitable for reduction.

It is necessary eventually to remove from the reducing receptacle a portion at least of the slag formed during the course of the reducing treatment. In a complete process of the invention, the relatively large iron content of this slag may be recovered by subjecting the slag to a reducing treatment in the presence of a basic slag-forming substance such as lime. The metallic iron product of such a process will not be of as high quality as the product formed in the phase of the process involving reduction from a molten bath of iron oxide-bearing material, but the process may be carried out economically and advantageously because of the hot molten condition of the initial material.

In the separation of the metallic iron and slag following or during the reducing treatment, the impurities are substantially completely separated from the metallic iron. When a wrought iron product is to be produced, the reduced mass is forged or squeezed until the slag content has been reduced to about 3% or less of the weight of the squeezed or forged product. This slag content is similar to the slag content of wrought iron produced heretofore, but the distribution of the slag differs in the two products.

According to the preferred method of the invention, a charge comprising a mixture of iron oxide and sufficient silica to form a suitably fluid bath is melted in any suitable manner. The temperature of the molten bath prior to reduction will be determined by its composition. Baths comprising large proportions of higher oxides of iron and baths comprising small proportions of silica will require higher temperatures for maintaining proper fluidity than will baths comprising large proportions of ferrous oxide and baths comprising larger proportions of silica. In general, suitably fluid baths may be produced at temperatures below the melting point of iron when iron oxide-bearing materials containing about 5 to 10 percent of silica by weight are employed.

When the charge is suitably molten, a solid reducing agent such, for example, as coal or coke is added thereto in a suitable receptacle, and reduction of the iron oxide commences. As reduction of the iron oxide to metallic iron and precipitation of the resulting solid metallic iron proceed, the proportion of silica in the remaining molten material increases and the melting point is lowered. Reduction of the iron oxide proceeds at satisfactory rates at temperatures not substantially higher than the melting temperatures of the baths. Therefore, as the melting point of the bath decreases, as a result of the production and precipitation of solid metallic iron, the temperature of the molten bath is preferably permitted to drop proportionately until a temperature of about 1250 to 1300° C. is established.

The solid reducing agent may be added in any suitable form. Thus, for example, coal or coke in finely divided forms or in the form of large pieces (3 or 4 inches in diameter or larger) may be employed. Likewise, original iron oxide-bearing material of any suitable degree of coarseness or fineness may be employed. The charge is preferably agitated during the melting and reducing operations to facilitate melting and reduction.

Reduction is preferably continued until the proportion of silica in the molten charge has beeen increased to about 20 percent. The degree of reduction may be controlled by controlling the amount of solid reducing agent added to the bath. When the melting and/or reducing operations are carried out with access of air it is advisable to employ an amount of reducing agent in excess of the amount required theoretically to accomplish the desired degree of reduction. In such cases, amounts of reducing agents about 8 to 15 percent in excess of the theoretical amounts are generally satisfactory. In calculating the amounts of reducing agents such as coal and coke to be employed, the content of volatile hydrocarbons may be disregarded and the calculations based on the fixed carbon content only, as the volatile hydrocarbons are largely eliminated by volatilization without becoming effective for reduction.

When reduction has proceeded to the desired extent the solid iron is removed from the receptacle in which the reducing operation was carried out, the molten slag bath being retained therein. The solid iron product, after removal from the furnace may be separated from adhering or occluded slag in any suitable manner. Thus, the slag and metallic iron may be separated by squeezing or forging or by melting the metallic iron product to form readily separable layers of metallic iron and slag. When the metallic iron product is squeezed or forged, any desired amount of slag may be removed. Squeezing or forging may be continued until products containing amounts of slag corresponding to the amounts usually contained in wrought iron are produced or until metallic iron products containing not more than about one percent of slag are formed.

After removal of the metallic iron from the reducing receptacle, the molten slag bath retained therein is preferably regenerated by the addition thereto of iron oxide-bearing material containing silica in smaller proportion, sufficient heat being employed in connection with the regenerating operation to produce a suitably fluid regenerated bath. The regenerated bath may then be subjected to a reducing treatment in the same manner as the original bath to form additional metallic iron. Regeneration, reduction and removal of solid metallic iron may be repeated until the slag volume has been increased to such proportions as to become unwieldy or difficult to treat in the reducing receptacle, when a portion of the slag may be removed to reduce the volume in the furnace. A portion of the slag may be retained in the reducing receptacle and utilized as a nucleus for providing a regenerated bath for reduction. Regeneration, reduction and removal of metallic iron and excess slag may be repeated constantly or as long as the condition of the reducing receptacle remains satisfactory for the operations.

All or a portion of excess slag removed from any reducing receptacle may be employed as a nucleus for forming an initial or regenerated bath in another receptacle. The excess slag not required for forming nuclei for other initial or regenerated baths may be subjected to reducing treatments in the receptacle in which it was produced or in other suitable reducing receptacles in the presence of suitable slag-forming materials for the reduction of iron oxide contained therein and the recovery of additional metallic iron products.

For the regeneration of the reduced molten baths, iron oxide-bearing materials containing relatively small amounts of silica are preferably employed; such materials, for example, as roll scale and iron ore concentrates. The iron ore, if desired, may be concentrated to remove substantially all of the associated gangue materials or concentration may be carried out only to the point at which products containing silica in proportions less than the proportion required to provide a bath suitable for reduction are formed. When an iron oxide-bearing material such as roll scale or a highly concentrated iron ore product is employed for regeneration, the amount added is preferably controlled to reduce the proportion of silica in the bath to about 5 to 10 percent by weight.

Any suitable type of apparatus may be employed in carrying out the process of my invention. Suitable apparatus for carrying out the melting and reducing treatments of my invention is illustrated in the accompanying drawing, in which Fig. 1 is a sectional side elevation of furnace similar to a mechanical puddling furnace; and Fig. 2 is a sectional end elevation of the furnace shown in Fig. 1.

The furnace proper is rectangular in shape, with a concave hearth 2, and a flat roof 3. It is supported by two hollow trunnions 21, one on each side, each resting in roller bearings set on top of supporting columns 17. The furnace may oscillate between these columns through an angle of 120°. Oscillation of the furace is accomplished by means of racks 9 engaging pinions 10 rigidly mounted on a shaft 14 which is connected to a suitable source of power (not shown). Producer gas and preheated air may be admitted through passages 12 and 13 on both sides of the furnace. Combustion products are withdrawn through two stacks 4 which communicate with the interior of the furnace and with a transversely extending conduit 19 which, in turn, communicates with a stack 20 leading to a recuperator 18. The conduit 19 and the stack 20 are so joined at to permit movement of the furnace without permitting ingress or egress of gases.

A door 15 forms the whole of one end of the furnace, and it is suspended by hinges 16 at the top and connected at the bottom by side rods 6 and 7 to a hydraulic cylinder 5 under the bottom. The substructure of the bottom 2 is composed of a series of rectangular pipes 11 through which water passes. Upon these pipes magnesite bricks are laid on edge, and on these, fluid basic cinder is charged. The sides and end of the furnace are composed of magnesite brick, while the roof 3 is silica brick.

In employing a furnace of the type illustrated for carrying out the method of the invention, ore or concentrates may be introduced into the furnace in the solid state and melted by means of heat generated by combustion of gases entering through burners 12 and 13, or a suitable molten charge may be provided otherwise. When the charge is suitably fluid, a solid reducing agent may be introduced into the furnace. If pure iron is desired, the furnace is held stationary while reduction takes place and pure iron separates on the bottom of the furnace. If wrought iron is desired the furnace is oscillated slowly until reduction is completed. When reduction is complete, the furnace is oscillated rapidly several times to roll the metal up into a roughly formed cylinder, after which it is withdrawn from the furnace in one mass. The mass of metallic iron may be squeezed in a hydraulic squeezer having movements in the two horizontal and the vertical directions. This operation may be controlled to remove excess cinder in the case of wrought iron and practically all of the cinder in case pure iron is desired. The slag and metallic iron may be separated by melting the metallic iron product to form separable layers of metallic iron and slag instead of by squeezing or forging, as hereinbefore explained.

I have successfuly treated magnetite ore having a composition, as mined, of approximately 56% iron and 12% silica, .025% sulphur, and 1.01% $P_2O_5$. This raw ore is preferably crushed to pass a 1½" screen and concentrated to contain from 60 to 65% of iron, although the raw ore may also be used without impairment of my process. This ore has been treated to produce metal containing less than .03% phosphorus and less than .07% of sulphur and .02% of carbon.

In the regeneration step in which materials of high iron concentration are added to the oxide bath, I have used magnetite ores concentrated to an iron content of 70% or above, or rolling mill scale which likewise contains about 70% of iron. Hematite and limonites and other iron-bearing materials can also be utilized by concentrating them to contain about 12% of silica before melting.

The solid carbonaceous reducing agent employed in my process may be either bituminous or anthracite coal or coke. I have used bituminous coal containing approximately 70% fixed carbon and .69% sulphur with successful results. While coal with low sulphur content is not necessary, it is preferable where it is easily available at low cost. The amount of solid reducing agent added is approximately 8% to 15% above that theoretically required for reduction.

The melting point of the above-described ores which I have treated successfully is around 1450° C. However, as soon as the reduction starts, the melting point immediately falls, reaching a temperature of approximately 1300° C. when the bath reaches a composition of about 8 to 15% FeO, 5 to 15% $Fe_2O_3$, and 6 to 10% $SiO_2$. As reduction proceeds further the melting point will continue to decrease, but at temperatures substantially lower than about 1300° C. reduction becomes more difficult. Owing to the fact that reduction is more difficult at low temperatures, I prefer to so conduct the operations as to maintain temperatures not substantially lower than about 1300° C.

A composition of 20% $SiO_2$ is preferably not exceeded since higher $SiO_2$ contents may result in the precipitation of fayalite and the consequent contamination of the iron, and, furthermore, reduction becomes difficult or impossible at the more desirable operating temperatures. If the silica content is under 5%, the resulting molten bath is so viscous that the reaction will be substantially retarded. It is therefore desirable to maintain the silica content of the bath within these limits, and I find that with 8% of $SiO_2$ I obtain very satisfactory results. In the operation of the batch process, I can obtain approximately 65% recovery of metallic iron utilizing the ores previously described. However, if the process is operated continuously, and pure concentrates are fed to the bath at the same rate at which iron is removed, the efficiency of reduction may be greatly increased.

The addition of from 1 to 5% of fluidizing agent such as sodium carbonate or fluorspar to the molten bath results in increased fluidity and allows more rapid precipitation of metalic iron as well as the more complete removal of the slag in the subsequent squeezing of the metallic mass. In case alloys are desired, I may incorporate in the bath of molten iron oxide-bearing material the oxides of such elements as aluminum, copper, and nickel in any proportions desirable and the metal precipitating at the bottom of the bath will be alloyed. I find that it is desirable, but not essential, in the production of alloys to incorporate with the coal which is added a thermic reducing agent such as ferrosilicon.

The bath of molten oxide in all applications of my process is kept substantially below the melting point of iron which is approximately 1530° C. The iron is therefore precipitated from the bath in substantially pure form and in a solid state. In view of the fact that impurities such as sulphur are practically insoluble in solid iron, these materials remain in the molten phase of the bath. The maintenance of the iron in the solid form also prevents absorption of carbon and results in the production of metal of low carbon content.

The iron produced being precipitated in solid form from a liquid bath is practically pure and contains no intrinsic silicates or oxides. The excess slag content in the iron mass removed from the bath can be almost completely removed if it is desirable, and I may therefore produce either wrought iron of the standard composition or wrought iron with varying slag contents or pure iron with substantially no slag inclusions. When wrought iron is made, microphotographs show that the slag is distributed and that the slag inclusions are small in size as compared with wrought iron made by the ordinary processes.

I claim:
1. The method of treating iron oxide-bearing material containing one or more impurities of an acid character which comprises subjecting a molten bath of the material, without the addition of fluxing material, to the action of a reducing agent at a temperature below the melting point of iron but sufficiently high to effect reduction of iron oxide contained in the bath to metallic iron, the reducing agent employed being incapable of reducing all of the iron oxide contained in the bath to metallic iron, sufficient unreduced iron oxide being retained in the bath to form a fluid slag with the impurites contained therein at the temperature employed.

2. The method of treating iron oxide-bearing material consisting essentially of iron oxide and one or more impurities of an acid character to produce metallic iron which comprises subjecting a molten bath of the material, without the addition of fluxing material, to the action of an amount of reducing agent insufficient to reduce all of the iron oxide contained therein to metallic iron at a temperature below the melting point of iron, thereby to form a coherent mass of solid metallic iron covered by molten slag containing unreduced iron oxide and the impurities.

3. The method of treating iron oxide-bearing material consisting essentially of iron oxide and one or more impurities of an acid character to produce metallic iron which comprises subjecting a molten bath of the material, without the addition of fluxing material, to the action of an amount of solid carbonaceous reducing agent insufficient to reduce all of the iron oxide contained therein to metallic iron at a temperature below the melting point of iron, thereby to form a coherent mass of solid metallic iron covered by molten slag containing unreduced iron oxide and the impurities.

4. The method of treating iron oxide-bearing material consisting essentially of iron oxide and one or more impurities of an acid character to produce metallic iron which comprises subjecting a molten bath of the material, without the addition of fluxing material, to the action of an amount of reducing agent insufficient to reduce all of the iron oxide contained therein to metallic iron at a temperature below the melting point of iron, thereby to form a coherent mass of solid metallic iron covered by molten slag containing unreduced iron oxide and the impurities, separating the metallic iron product and slag, and subjecting the metallic iron product to a forging or squeezing operation.

5. The method of treating iron oxide-bearing material consisting essentially of iron oxide and one or more impurities of an acid character to produce metallic iron which comprises subjecting a molten bath of the material, without the addition of fluxing material, to the action of an amount of solid carbonaceous reducing agent insufficient to reduce all of the iron oxide contained therein to metallic iron at a temperature below the melting point of iron, thereby to form a coherent mass of solid metallic iron covered by molten slag containing unreduced iron oxide and the impurities, separating the metallic iron product and slag, and subjecting the metallic iron product to a forging or squeezing operation.

6. The method of treating iron oxide-bearing material containing a relatively small amount of silica to produce metallic iron which comprises subjecting a molten bath of the material to the action of a reducing agent at a temperature below the melting point of iron to reduce a portion of the iron oxide contained therein to metallic iron, thereby to form a solid metallic iron product and a molten slag product containing iron oxide and silica, and regenerating the molten bath to avoid the formation of slag containing more than a predetermined proportion of silica.

7. The method of treating iron oxide-bearing material containing a relatively small amount of silica to produce metallic iron which comprises subjecting a molten bath of the material to the action of a reducing agent at a temperature below the melting point of iron to reduce a portion of the iron oxide contained therein to metallic iron, thereby to form a solid metallic iron product and a molten slag product containing iron oxide and silica, and regenerating the molten bath to avoid the formation of slag containing more than about 20% by weight of silica.

8. In a method of treating iron oxide-bearing material containing silica to produce metallic iron involving the treatment of a molten bath of the material with a reducing agent to effect reduction of iron oxide contained therein, the improvement which comprises adding iron oxide-bearing material containing a relatively small amount of silica to the bath after commencement of the reducing operation to replace iron oxide reduced to metallic iron thus to control the proportion of silica in the bath.

9. The method of treating iron oxide-bearing material containing a relatively small amount of silica which comprises subjecting a molten bath of the material to the action of a reducing agent at a temperature below the melting point of iron until a portion of the iron oxide has been reduced to metallic iron and a molten slag containing silica in predetermined proportion has been formed, lowering the proportion of silica in the molten slag by adding thereto iron oxide-bearing material containing silica in small proportion, and subjecting the resulting product to a reducing treatment.

10. The method of producing metallic iron which comprises heating iron oxide-bearing material containing a relatively small amount of silica to a temperature of about 1450° C. to form a molten bath, and subjecting the resulting molten bath to the action of a reducing agent until a portion of the iron oxide has been reduced to metallic iron and a molten slag containing silica in predetermined proportion has been formed, lowering the proportion of silica in the molten slag by adding thereto iron oxide-bearing material containing silica in small proportion, and subjecting the resulting product to a reducing treatment.

11. The method of producing metallic iron which comprises subjecting a molten bath of iron oxide-bearing material containing a relatively small amount of silica to the action of a solid carbonaceous reducing agent in the presence of air at a temperature below the melting point of iron to reduce a portion of the iron oxide contained therein to metallic iron, thereby to form a solid metallic iron product and a molten slag product containing iron oxide and silica, the amount of reducing agent employed being about 8 to 15 percent in excess of the theoretical amount required to reduce to metallic iron sufficient iron oxide to increase the proportion of silica in the molten bath to the point at which the composition of the bath will correspond to the composition of fayalite.

12. The method of treating iron oxide-bearing material consisting essentially of iron oxide and one or more impurities of an acid character to produce metallic iron which comprises subjecting a molten bath of the material, without the addition of fluxing material, to the action of an amount of solid carbonaceous reducing agent insufficient to reduce all of the iron oxide contained therein to metallic iron at a temperature below the melting point of iron, thereby to form a coherent mass of solid metallic iron covered by molten slag containing unreduced iron oxide and the impurities, agitating the bath containing the reducing agent to accelerate reduction, separating the metallic iron product and slag, and subjecting the metallic iron product to a forging or squeezing operation.

13. The method of producing metallic iron which comprises subjecting a molten bath of iron oxide-bearing material containing a relatively small amount of silica to the action of a solid carbonaceous reducing agent at a temperature below the melting point of iron to reduce a portion of the iron oxide contained therein to metallic iron, thereby to form a solid metallic iron product and a molten slag product containing iron oxide and silica, the amount of reducing agent employed being not substantially in excess of the amount required to reduce to metallic iron sufficient iron oxide to increase the proportion of silica in the molten bath to a point at which the composition of the bath will correspond to the composition of fayalite, regenerating the molten bath by the addition thereto of iron oxide-bearing material containing silica in a lesser proportion than said first named oxide-bearing material, and subjecting the regenerated bath to a reducing treatment to form similar metallic iron and slag products.

14. The method of producing metallic iron which comprises subjecting a molten bath of iron oxide-bearing material containing a relatively small amount of silica to the action of a solid carbonaceous reducing agent at a temperature between about 1250° C. and the melting point of iron, to reduce a portion of the iron oxide contained therein to metallic iron, thereby to form a solid metallic iron product and a molten slag product containing iron oxide and silica, the amount of reducing agent employed being not substantially in excess of the amount required to reduce to metallic iron sufficient iron oxide to increase the proportion of silica in the molten bath to a point at which the composition of the bath will correspond to the composition of fayalite, regenerating the molten bath by the addition thereto of iron oxide bearing material containing silica in lesser proportion than said first named oxide-bearing material, and subjecting the regenerated bath to a reducing treatment to form similar metallic iron and slag products.

15. In the method of producing metallic iron, which comprises subjecting a molten bath of iron oxide-bearing material containing a relatively small amount of silica to the action of a carbonaceous solid reducing agent to form a solid metallic iron product and a molten slag product containing iron oxide and silica, the improvement which comprises regenerating said molten slag bath by the addition of iron oxide-bearing material containing silica in lesser proportion than said first named oxide bearing material, and subjecting the regenerated bath to a reducing treatment to form similar metallic iron and slag products.

16. The method of producing metallic iron which comprises subjecting a molten bath of iron oxide-bearing material containing a relatively small amount of silica to the action of a solid carbonaceous reducing agent at a temperature below the melting point of iron to reduce a portion of the iron oxide contained therein to metallic iron, thereby to form a solid metallic iron product and a molten slag product containing iron and silica, the amount of reducing agent employed being not substantially in excess of the amount required to reduce to metallic iron sufficient iron oxide to increase the proportion of silica in the molten bath to a point at which the composition of the bath will correspond to the composition of fayalite, regenerating the molten bath by the addition thereto of iron oxide-bearing material containing silica in a lesser proportion than the molten bath, and subjecting the regenerated bath to a reducing treatment to form similar metallic iron and slag products.

17. In the method of producing metallic iron which comprises subjecting a molten bath of iron oxide-bearing material to the action of a solid carbonaceous reducing agent at a temperature below the melting point of iron to form a solid metallic iron product and molten slag product, the improvement which comprises regenerating the molten bath by the addition thereto of further iron oxide-bearing material containing silica in lesser proportion than the molten bath, and subjecting the regenerated bath to a reducing treatment to form metallic iron and slag products.

18. The method of producing metallic iron which comprises subjecting a molten bath of iron oxide-bearing material containing a relatively small amount of silica to the action of a solid carbonaceous reducing agent at a temperature between about 1250° C. and the melting point of iron, to reduce a portion of the iron oxide contained therein to metallic iron, thereby to form a solid metallic iron product and a molten slag product containing iron oxide and silica, the amount of reducing agent employed being not substantially in excess of the amount required to reduce to metallic iron sufficient iron oxide to increase the proportion of silica in the molten bath to a point at which the composition of the bath will correspond to the composition of fayalite, regenerating the molten bath by the addition thereto of iron oxide bearing material containing silica in lesser proportion than the molten bath, and subjecting the regenerated bath to a reducing treatment to form similar metallic iron and slag products.

FREDERICK A. HARTGEN.